United States Patent
Bertrand (10) Patent No.: US 9,677,682 B2
(45) Date of Patent: Jun. 13, 2017

(54) SERVO VALVE WITH DOUBLE MOBILE ASSEMBLY

(71) Applicant: ZODIAC HYDRAULICS, Chateaudun (FR)

(72) Inventor: Jean-Luc Bertrand, Orleans (FR)

(73) Assignee: ZODIAC HYDRAULICS, Chateaudun (FR)

( * ) Notice: Subject to any disclaimer, the term of this patent is extended or adjusted under 35 U.S.C. 154(b) by 0 days.

(21) Appl. No.: 14/794,141

(22) Filed: Jul. 8, 2015

(65) Prior Publication Data
US 2016/0033052 A1    Feb. 4, 2016

(30) Foreign Application Priority Data

Jul. 31, 2014  (FR) ...................... 14 57473

(51) Int. Cl.
| | | |
|---|---|---|
| *F16K 31/06* | (2006.01) | |
| *F15B 13/043* | (2006.01) | |
| *F15B 21/04* | (2006.01) | |

(52) U.S. Cl.
CPC ...... *F16K 31/0613* (2013.01); *F15B 13/0436* (2013.01); *F15B 21/042* (2013.01)

(58) Field of Classification Search
CPC .............. F16K 31/0613; F15B 13/0436; F15B 13/0402; F15B 13/028; Y10T 137/2322; Y10T 137/86582; Y10T 137/8659; Y10T 137/86606; Y10T 137/86622
See application file for complete search history.

(56) References Cited

U.S. PATENT DOCUMENTS 3,270,623 A * 9/1966 Garnjost ................. F15B 18/00
                                                     137/625.62
3,406,701 A * 10/1968 Meulendyk ......... F15B 13/0436
                                                     137/625.63
(Continued)

FOREIGN PATENT DOCUMENTS

| EP | 0 260 065 A2 | 3/1988 |
|---|---|---|
| FR | 2 963 393 A1 | 2/2012 |

OTHER PUBLICATIONS

French Preliminary Search Report of FR 1457473 dated Apr. 24, 2015.

*Primary Examiner* — Craig Schneider
*Assistant Examiner* — Kevin Barss
(74) *Attorney, Agent, or Firm* — Sughrue Mion, PLLC (57) ABSTRACT

Hydraulic servo valve (1) comprising:
 a power stage (3) comprising a power distribution member able to move between two extreme positions in order to place one or more service portions (C1, C2) in communication with a feed port (P) supplying hydraulic fluid and with a return port (R);
 a control stage (4) for controlling the position of the power distribution member, the control stage (4) comprising a torque motor (MC) that can be operated in such a way as to actuate a fluid ejection member secured to an elastically deformable element and designed to cause a control pressure of the power distribution member to vary;
characterized in that the fluid ejection member comprises a first and a second fluid injector (60, 63) which are fed by fluid feed means able to feed either just one of the first and second fluid injectors (60, 63) or both injectors simultaneously.

9 Claims, 5 Drawing Sheets

(56) References Cited

U.S. PATENT DOCUMENTS

| | | | | |
|---|---|---|---|---|
| 3,424,183 A | * | 1/1969 | Coakley | F15B 13/0436 137/625.64 |
| 3,460,436 A | | 8/1969 | Takeda | |
| 3,479,925 A | * | 11/1969 | Hayner | F15B 9/00 91/367 |
| 3,555,969 A | * | 1/1971 | Shah | F15B 9/17 137/625.62 |
| 3,584,649 A | * | 6/1971 | Cobb | F15B 13/0436 137/625.61 |
| 3,621,880 A | * | 11/1971 | Jessee | F15B 13/0436 137/625.63 |
| 4,227,443 A | * | 10/1980 | Toot | F15B 13/0436 137/625.61 |
| 4,664,135 A | * | 5/1987 | Hayner | F15B 13/043 137/625.64 |
| 5,156,189 A | * | 10/1992 | Tranovich | F15B 13/043 137/625.63 |
| 5,186,213 A | * | 2/1993 | Urata | F15B 13/0402 137/596.15 |
| 2013/0087223 A1 | * | 4/2013 | Ozzello | F15B 13/0436 137/551 |
| 2013/0206260 A1 | * | 8/2013 | Ozzello | F15B 13/0436 137/625.6 |

* cited by examiner

SERVO VALVE WITH DOUBLE MOBILE ASSEMBLY

FIELD OF THE INVENTION

The invention relates to a hydraulic servo valve of jet deflection type.

PRIOR ART

A conventional jet deflection servo valve comprises a control stage and a power stage.

The power stage generally comprises a power distribution member able to move in a housing of the body of the servo valve between two extreme positions so as to place one or more service ports in communication with a feed port supplying the servo valve with hydraulic pressure and with a return port.

The power distribution member in its housing allows the delivery of an output pressure or flow rate that are proportional to the movement of the said power distribution member.

The control stage of such a servo valve comprises a torque motor whose rotor is connected to a mobile hydraulic injector facing a fixed hydraulic receiver. In general, the torque motor of the control stage acts on magnetic blades of a mobile assembly of which an elastically deformable element that is functionally connected to a fluid supplying duct equipped at its end with a hydraulic injector. The magnetic blades are secured to the elastically deformable element in such a way as to submit this element to deformation that is proportional to the magnitude of the electrical instruction. This deformation causes the injector to move relative to the fixed receiver and generates a control pressure resulting from the difference in the pressures transmitted by the drilled channel to the ends of the housing of the power distribution member. This control pressure is used for fine movement of the power member.

There are conventionally three types of mobile assembly of a jet deflection servo valve control stage:
- a first type in which the elastically deformable element is a bar subjected to torsion;
- a second type in which the elastically deformable element is a tube subjected to bending;
- a third type in which the elastically deformable element is a tube subjected to torsion. This third type is covered by a patent application FR2963393 by the applicant.

These servo valves also comprise a feedback member which slaves the position of the power distribution member to the rotor of the torque motor and generates on the torque motor a torque that is subtracted to the control action. The feedback member may be of mechanical type, using a feedback rod connecting the rotor of the servo valve to the power distribution member. The feedback member may equally comprises a position sensor, of the LVDT (Linear Variable Differential Transformer) type, measuring the position of the power member and the instructions of which are transmitted to a processing unit that controls the electrical instruction received by the control stage.

The bore sections of the duct supplying the hydraulic fluid and of the hydraulic injector are dimensioned so as to allow the fluid a laminar flow and a flow rate that is high enough to rapidly displace the power distribution member while at the same time minimizing the amount of flow bled off to operate the servo valve. This is because a too small diameter of the duct and/or of the injector leads to an insufficient flow rate leaving the injector and impairs the responsiveness of the servo valve. Conversely, a too high diameter increases the permanent consumption of the servo valve and therefore the energy demand from the hydraulic system. The sizing of the bore sections is generally based on how the corresponding hydraulic fluid behaves, notably at temperature, pressure and viscosity ranges that are defined according to the conditions under which the equipment is used. However, there are situations of use in which these parameters may adopt values that lie outside of the ranges for which they have been engineered. One particularly critical situation is cold starting because since the viscosity of hydraulic fluids varies with temperature, this viscosity may reach values that are incompatible with servo valve operations, even in downgraded mode. In order to address this problem, devices that heat the hydraulic fluid using electrical tracing devices that raise the hydraulic fluid to a temperature that allows the servo valve to operate have been contemplated. Such a solution makes the installation on which the servo valve is mounted more complicated and heavier, something which is particularly detrimental in aeronautical applications. Furthermore, it is necessary to wait for the fluid to reach the required temperature before the apparatus can be used, this presenting problems of availability such as, for example, in military or civil applications in which the equipment needs to be able to be operational within a short space of time or in extreme weather conditions.

Improvements to the low-temperature viscosity of the hydraulic fluid have also been contemplated, but fluids that behave well at low temperature have a limited maximum operating temperature, and vice versa.

SUBJECT OF THE INVENTION

It is an object of the invention to reduce the operations required prior to bringing a servo valve into operation at low temperature.

SUMMARY OF THE INVENTION

To this end there is provided a hydraulic servo valve comprising:
- a power stage comprising a power distribution member able to move between two extreme positions in order to place one or more service portions in communication with a feed port supplying hydraulic fluid and with a return port;
- a control stage for controlling the position of the power distribution member, the control stage comprising a torque motor that can be operated in such a way as to actuate a fluid ejection member secured to an elastically deformable element and designed to cause a control pressure of the power distribution member to vary. According to the invention, the fluid ejection member comprises a first and a second fluid injector which are fed by fluid feeding means able to feed either just one of the first and second fluid injectors or both injectors simultaneously.

According to one particular embodiment, the first and second fluid injectors are respectively fed by a first and a second fluid supply ducts having different fluid bore sections and/or the bore sections of the injectors of which are different.

Depending on the application, the elastically deformable element is a torsion bar, a bending tube or a torsion tube.

Ideally, the mobile element comprises a feedback rod designed to collaborate with the power distribution member of the power stage.

For preference, the power stage comprises a power distribution member capable of moving in a tubular housing, and each end of the tubular housing comprises a chamber into which a first hydraulic fluid inlet supplying the hydraulic fluid ejected by the first fluid injector and a second hydraulic fluid inlet supplying the hydraulic fluid ejected by the second fluid injector open.

BRIEF DESCRIPTION OF THE DRAWINGS

Reference will be made to the attached figures among which.

DETAILED DESCRIPTION OF THE INVENTION

Figure 1:
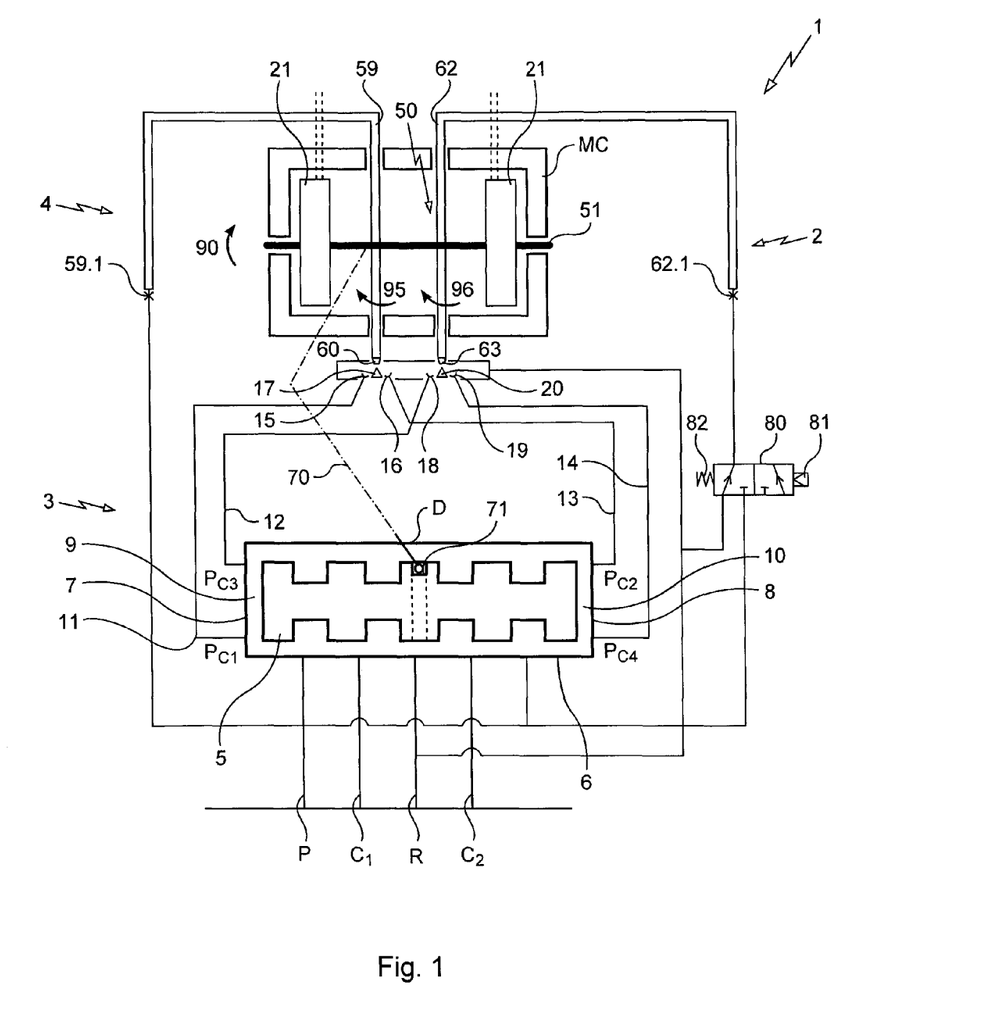
FIG. 1 is a schematic overall depiction of a first embodiment of a servo valve according to the invention.

With reference to FIG. 1, the servo valve according to the invention, generally denoted 1, comprises, inside a body 2, a power stage 3 and control stage 4. The power stage 3 comprises a power distribution member 5 mounted to slide in a tubular housing 6 of the body 2. The power distribution member 5 is arranged, in the known way, so that it selectively establishes communication between openings in the housing 6 connected fluidically to the hydraulic fluid feed ports P and service ports C1, C2 and return port R of the servo valve. The ends of the power distribution member 5 respectively define with the ends 7 and 8 of the tubular housing 6 a first chamber 9 and a second chamber 10. Two fluid inlets 11 and 12 open into the first chamber 9 of the tubular housing 6 whereas two other fluid inlets 13 and 14 open into the second chamber 10 of the tubular housing 6. The fluid inlets thus open into separate chambers. The fluid inlets 11 and 13 are respectively connected to the first receiving port 15 and to the second receiving port 16 of a first fluid receiver 17 of the control stage 4. The fluid inlets 12 and 14 are themselves respectively connected to the first receiving port 18 and to the second receiving port 19 of a second fluid receiver 20 of the control stage 4. The power distribution member is able to move between a first and a second extreme position corresponding respectively to the first chamber 9 having a minimum volume and having a maximum volume.

Figure 2:
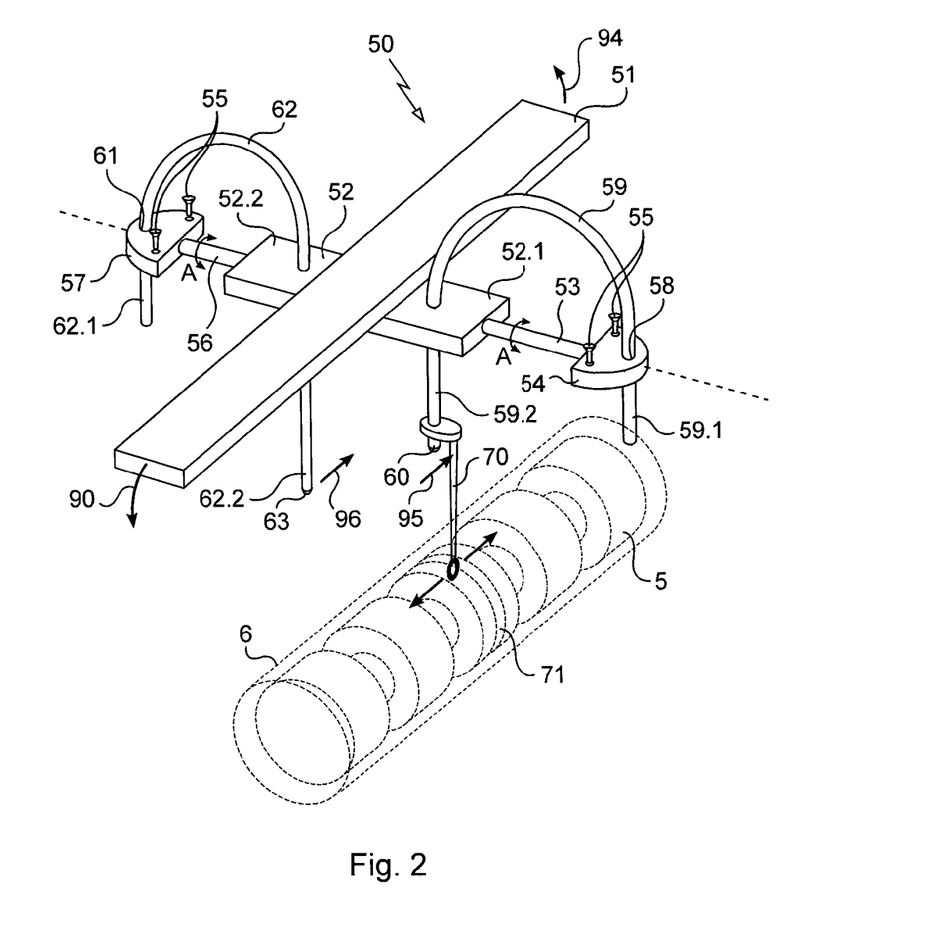
FIG. 2 is a schematic detailed perspective view of a mobile assembly according to the invention.

With reference to FIGS. 1 and 2, the control stage 4 comprises a torque motor MC whose coils 21 interact magnetically with the ends of a rectangular magnetic vane 51 of a mobile assembly 50 so as to control the position thereof as a function of an electrical signal. The mobile assembly 50 also comprises a central element 52 of substantially rectangular shape and the longitudinal direction of which extends substantially at right angles to the magnetic blade 51. The first end 52.1 of the central element 52 is connected via a first torsion bar 53 to a first support 54 in the shape of a half disc and provided with two drillings which are intended to accept fixing screws 55 for securing the first support 54 to the body 2 of the servo valve 1. The second end 52.2 of the central element 52 is connected via a second torsion bar 56 to a second support 57 in the form of a half disc and provided with two drillings intended to accept fixing screws 55 for securing the second support 57 on the body 2 of the servo valve 1. The first support 54 also comprises a third drilling 58 through which there extends a first duct 59 having an inside diameter of the order of one millimeter (corresponding to a bore section of 0.8 mm$^2$) and which forms a 180° arc in order then to extend through the first end 52.1 of the central element 52. The duct 59 is connected to the support 54 and to the first end 52.1 of the central element 52, for example by welding. The first end 59.1 of the portion of the first duct 59 connected to the support 54 is fed with hydraulic fluid at the feed pressure via the housing 6 whereas the second end 59.2 of the portion of the first pipe duct 59 connected to the central element 52 is connected to a first fluid injector 60 the diameter of which is between two and three tenths of a millimeter and which faces the first fluid receivers 17. The second end 59.2 of the first duct 59 also comprises a feedback rod 70 collaborating with a groove 71 of the power distribution member 5. In symmetry with this, the second support 57 comprises a third drilling 61 through which a second duct 62 of a diameter of between two and three millimeters passes and which makes a 180° arc before then extending through the second end 52.2 of the central element 52. The first end 62.1 of the portion of the second duct 62 that is connected to the support 57, and the second end 62.2 of the portion of the second duct 62 that is connected to the central element 52, are respectively connected to the support 57 and to the second end 52.2 of the central element 52, for example by welding. The first end 62.1 of the second duct 62 is supplied with hydraulic fluid at the supply pressure via the housing 6. A hydraulic distributor 80 with a spool is installed on the fluid feed of the first end 62.1 of the second duct 62. The second end 62.2 for its part is provided with a second fluid injector 63 of which the diameter is of the order of one millimeter, facing the second fluid receiver 20.

The directional control valve 80 is electrically operated using an electrical coil 81 and is returned positionally by a spring 82. The directional control valve can adopt two states. A first state connecting the fluid supply supplying the end 62.1 of the second pipe 62 to the housing 6 and allowing it to be supplied with fluid at the supply pressure, and a second state (depicted in FIG. 1) in which the fluid supply supplying the end 62.1 of the second duct 62 is connected to the return port R of the servo valve.

This then produces a two-stage servo valve 1 comprising a power stage 3 comprising a power distribution member 5 able to move between two extreme positions in order to place the service ports C1 and C2 with a feed port P supplying hydraulic fluid and with a return port R. The servo valve 1 also comprises a control stage 4 comprising a torque motor MC that can be controlled in such a way as to control the position of the mobile assembly 50 of which an elastically deformable element made up of the bars 53 and 56 is secured to the hydraulic-fluid injectors 60 and 63 via the central element 52. Altering the position of the fluid injectors 60 and 63 with respect to the fluid receivers 17 and 20 causes the pressures in the chambers 9 and 10 to vary and results in a control pressure controlling the power distribution member 5, which pressure moves this member in the housing 6. The fluid injectors 60 and 63 can operate simultaneously and the supply to the second fluid injector 63 can be interrupted by applying an electrical instruction to the coil 81 commanding the change of state of the directional control valve 80 and allowing just one fluid injector 60 to operate.

Figure 3:
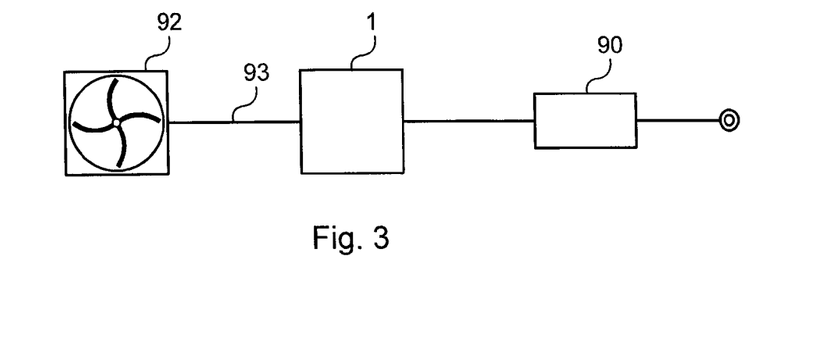
FIG. 3 is schematic view of equipment comprising a servo valve according to the invention.

Such a servo valve 1 is advantageously used to control a hydraulic actuator 90 of an equipment 91, such as an aircraft. If the equipment 91 incorporating the servo valve 1 is brought into operation in very low temperatures, the viscosity of the hydraulic fluid circulated by the pump 92 in the hydraulic network 93 of the equipment 91 is particularly high. The directional control valve 80 is then placed in its first position and supplies hydraulic fluid to the first ends 62.1 and 59.1 of the pipes 62. In that situation, the two fluid injectors 60 and 63 operate simultaneously. When an electrical instruction is applied to the torque motor MC, the magnetic field thus created moves the magnetic blade 51 and causes the first fluid injector 60 and the second injector 63 to move respectively relative to the fluid injectors 17 and 20. By way of example, FIG. 2 depicts a movement of the blade 51 in the direction 94 that then causes the fluid injectors 60 and 63 to move respectively in a direction 95 and 96. The movements of the fluid injectors 17 and 20 in the directions 95 and 96 respectively lead a significant quantity of hydraulic fluid to the first fluid receivers 15 and 18. The respective first inlets of fluid 11 and 12 to the first fluid receivers 15 and 18 open into the first chamber 9 and carry the hydraulic fluid into that chamber. The quantity of hydraulic fluid carried into the first chamber 9 increases the pressure therein in comparison with the pressure present in the chamber 10. This pressure differential then moves the power distribution member 5 from the chamber 9 to the chamber 10 and therefore uncovers the apertures of the housing 6 so as to deliver a pressure to the service ports C1 and C2 that is proportional to the electrical instruction applied to the torque motor MC. Whereas a supply of hydraulic fluid via a single pipeline 59 would not have made it possible to create enough of a pressure differential to move the power member 5 because of the high viscosity that the hydraulic fluid has at low temperature, the combined supplies of hydraulic fluid by the pipes 59 and 62 make it possible, at low temperature, to use the servo valve 1 to bring the equipment 90 into operation. When the hydraulic fluid reaches a temperature, and therefore a viscosity, corresponding to the nominal conditions of operation of the hydraulic fluid in the servo valve 1, an electrical instruction is sent to the coil 81 in order to make the hydraulic slide 80 move into its second position and interrupt the supply of fluid to the second fluid injector 63, and therefore the operation thereof.

This then provides a servo valve 1 which, for a limited increase in weight, corresponding substantially to the mass of the second pipe 62, allows a servo valve to be brought into operation almost immediately at low temperature.

Elements identical or similar to those described hereinabove bear a reference identical thereto in the following description of the second, third and fourth embodiments.

Figure 4:
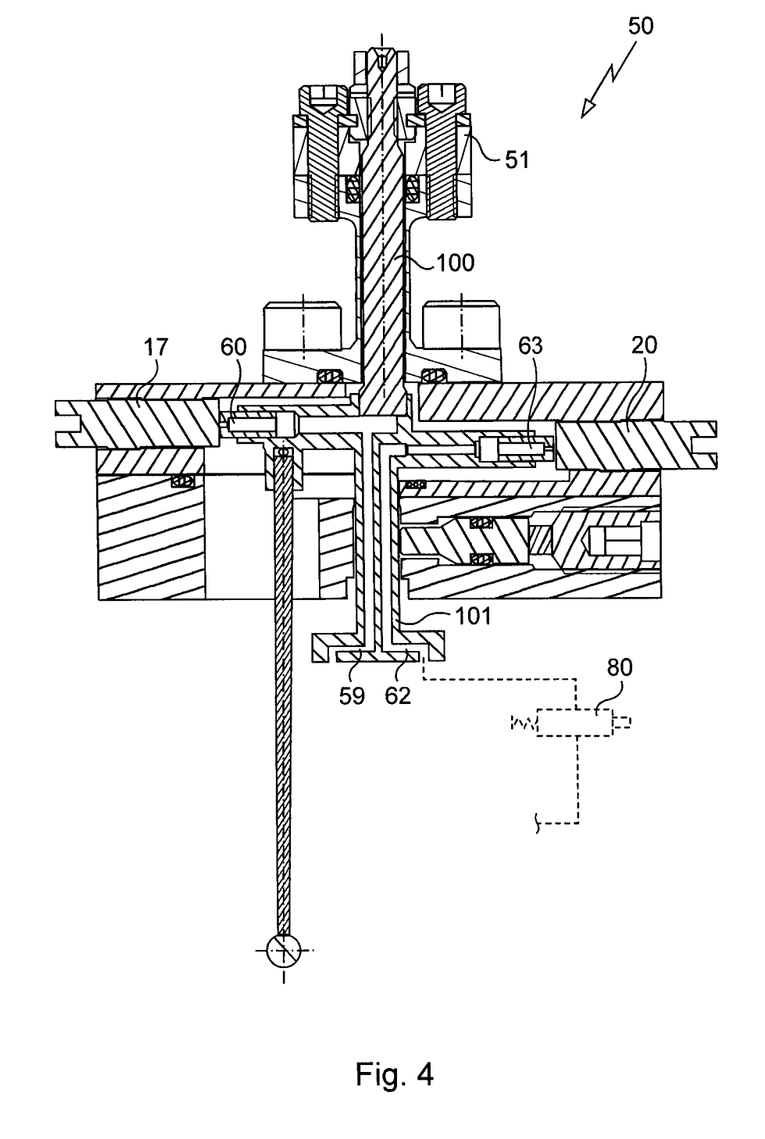
FIG. 4 is a schematic view in vertical section of a second embodiment of the servo valve according to the invention.

With reference to FIG. 4, the control stage 2 of the servo valve 50 comprises a magnetic blade 51 mounted at a first end of a torsion tube 100. The second end 101 of the torsion tube 100 comprises a first pipe 59 and a second pipe 62 for respectively supplying fluid to the hydraulic injectors 60 and 63. The fluid injectors 60 and 63 are secured to the torsion tube 100 and respectively face receivers 17 and 20 of which the fluid receivers 15, 16, 18 and 19 are connected to the chambers 9 and 10 of the housing 6. In use, an electrical instruction applied to the magnetic blade 51 causes torsion of the tube 100 about its axis. This torsion causes the injectors 60 and 63 to move relative to the receivers 17 and 20. The supply of hydraulic fluid via the pipes 11 to 14 connected to the fluid receivers 15 to 19 generates a control pressure which moves the power distribution member 5 in such a way as to deliver an output pressure to the ports C1 and C2 that is proportional to the electrical instruction applied to the magnetic blade 51. When the hydraulic fluid reaches a temperature, and therefore a viscosity corresponding to the nominal conditions of operation of the hydraulic fluid in the servo valve 1, an electrical instruction is sent to the coil 81 to make the hydraulic slide 80 move into its second position and interrupt the supply of fluid to the second fluid injector 63, and therefore the operation thereof.

Figure 5:
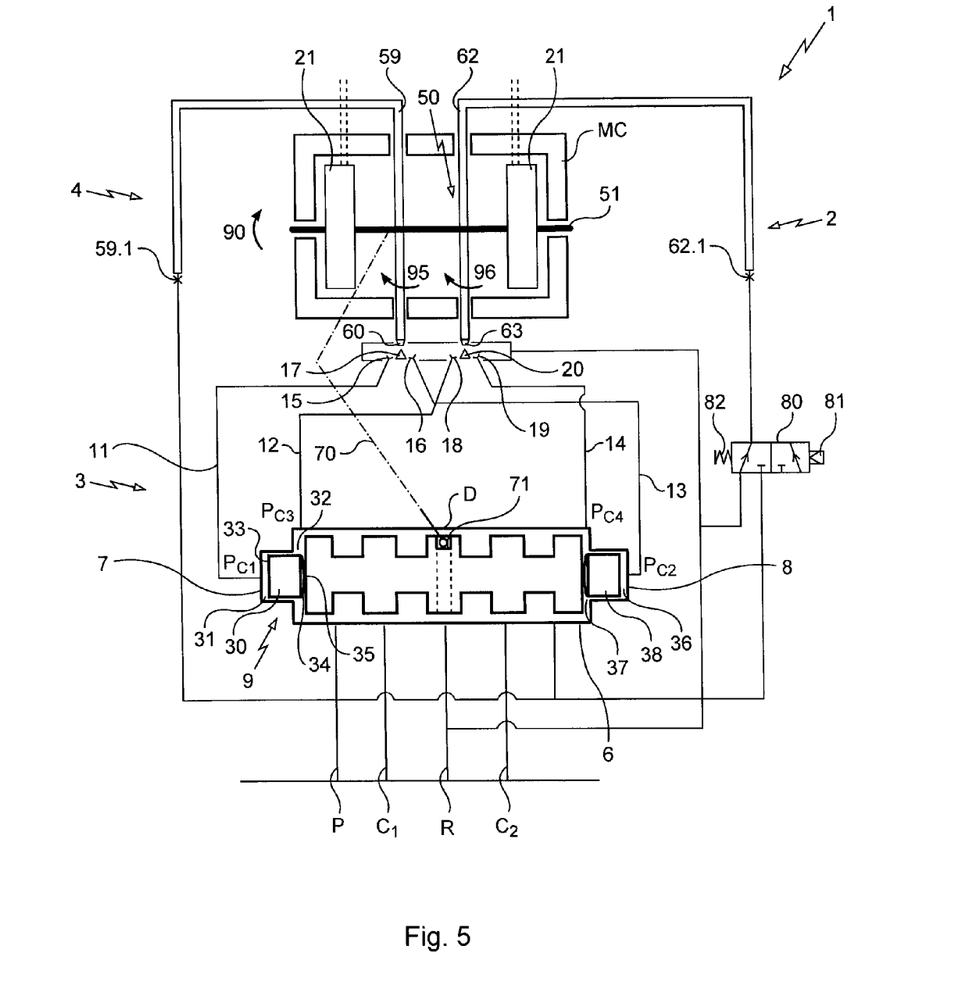
FIG. 5 is a schematic view in vertical section of a third embodiment of the servo valve according to the invention.

The third embodiment of the hydraulic servo valve 50 is described with reference to FIG. 5. According to this embodiment, the first chamber 9 comprises a cylinder 30 able to move in the tubular housing 6 defining a permanent control sub-chamber 31 and a transient control sub-chamber 32. The control sub-chamber 31 is defined on the one hand by the end 7 of the tubular housing 6 and on the other hand by a first face 33 of the cylinder 30. The second face 34 of the cylinder 30 which is the opposite face to the first face 33 is domed and in contact with an end 35 of the power distribution member 5. The transient control sub-chamber 32 is defined on the one hand by the second face 34 of the cylinder 30 and, on the other hand, by the end 35 of the power member 5. The fluid inlet 11 opens into the permanent sub-chamber 31 whereas the fluid inlet 12 opens into the transient control sub-chamber 32. The second chamber 10 of the tubular housing 6 comprises, correspondingly, a permanent control sub-chamber 36 separated from a transient control sub-chamber 37 by a cylinder 38 identical to the cylinder 30. The fluid inlet 13 opens into the permanent control sub-chamber 36 whereas the fluid inlet 14 opens into the transient control sub-chamber 37.

The operation of the servo valve remains the same as previously described. This configuration allows the forces applied by the pressurizing of each of the sub-chambers to be summed.

Figure 6:
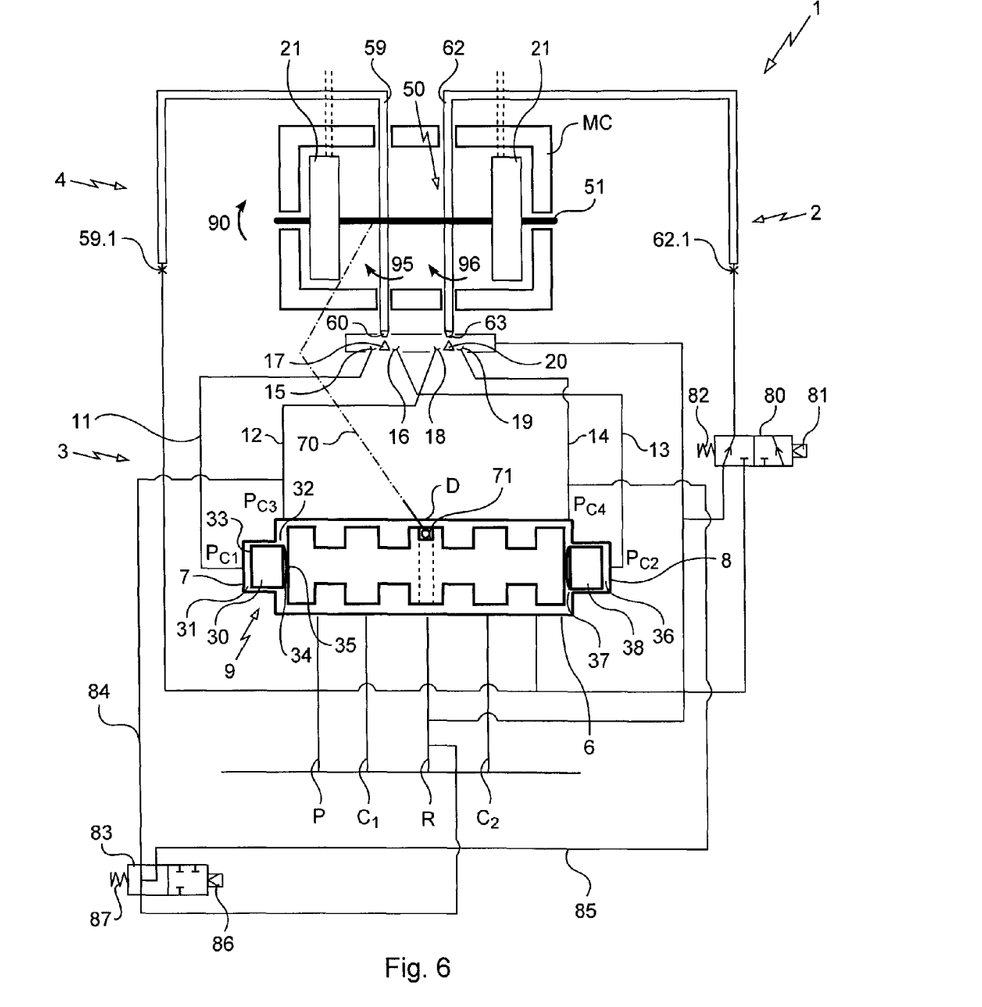
FIG. 6 is a schematic view in vertical section of a fourth embodiment of the servo valve according to the invention.

The fourth embodiment described with reference to FIG. 6 is an improvement on the third embodiment of FIG. 5. In this embodiment, a hydraulic directional control valve 83 with a valve slide receives tapings 84 and 85 taken respectively from the fluid inlets 12 and 14 supplying the transient control chambers 32 and 37. The directional control valve 83 is electrically operated using an electrical coil 86 and is returned positionally by a spring 87. The directional control valve 83 can adopt two states. A first state in which the tapings 84 and 85 are plugged, and a second state (depicted in FIG. 6) in which these tapings 84 and 85 are connected to the return port R of the servo valve. The first state of the directional control valve 83 is adopted when the directional control valve 80 is in its first state. In this configuration, the second fluid injector 63 is supplied and the tapings 84 and 85 are plugged. When the directional control valve 80 moves into its second state and cuts off the fluid supplied to the second fluid injector 63, the directional control valve 83 likewise switches to its second state. In this configuration, the two transient control chambers 32 and 37 are subjected to equal pressures. This reduces unwanted forces on the mobile power member 5 caused by the recirculation of fluid between the transient control chambers 32 and 37. For preference, the electrical coils 81 and 86 operating the hydraulic slides 80 and 83 may be coupled.

Of course, the invention is not restricted to the embodiments described but encompasses any alternative that falls within the scope of the invention as defined by the claims.

In particular, although here the power distribution member is slideably mounted in a tubular housing of the body of the servo valve, the invention equally applies to other types of mounting of the power member in the body of the servo valve, such as a mounting in a sleeve attached to the body of the servo valve for example;

although here a feedback rod is functionally connected to the power distribution member, the invention applies to other types of feedback means such as, for example, feedback involving an LVDT that measures the position of the power member and the information from which is exploited in order to modulate the electrical instruction applied to the control stage;

although here the mobile assembly comprises two elastic elements in the form of two torsion bars, the invention equally applies to other types of elastically deformable element such as, for example, a single torsion bar, a torsion tube or a bending tube;

although here the bore sections of the first and second fluid conveying pipes are different, the invention equally applies to first and second fluid conveying pipes of identical bore section;

although here the bore sections of the first and second fluid injectors differ, the invention equally applies to first and second fluid injectors of identical bore sections;

although here the servo valve comprises two service ports, the invention equally applies to a servo valve having a number of different service ports, such as, for example, a single service port or more than two;

although here the control stage is comprised within the body of the servo valve, it may be fixed partly or in full to the body of the servo valve rather than contained within it;

although here the supports for the central elements allowing the mobile assembly to be fixed to the body of the servo valve are in the form of half discs, the invention equally applies to other means of fixing the mobile assembly to the body of the servo valve, such as supports of square or any shape, or attachment to intermediate components fixed to the body of the servo valve;

although here the directional control valve is operated electrically using an electrical coil, the invention equally applies to other types of actuator for operating the directional control valve or other types of means for changing the state of the directional control valve, such as for example a state change brought about by a pressure or using a thermally initiated mechanical effect;

although here the diameters of the first and second pipes are respectively one millimeter and from two to three millimeters, the invention equally applies to other values of pipe diameter, or even pipes of equal diameters; and the same goes for the diameters of the injectors;

although here the cylinder faces in contact with ends of the power distribution member are domed, the invention equally applies to other geometries of contact face, such as faces that are planar, concave, or that have any geometry.

The invention claimed is:

1. A hydraulic servo valve (1) comprising:
a power stage (3) comprising a power distribution member able to move between two extreme positions in order to place one or more service portions (C1, C2) in communication with a feed port (P) supplying hydraulic fluid and with a return port (R);
a control stage (4) for controlling the position of the power distribution member, the control stage (4) comprising a torque motor (MC) that can be operated in such a way as to actuate a fluid ejection member secured to an elastically deformable element and designed to cause a control pressure of the power distribution member to vary;
wherein the fluid ejection member comprises a first and a second fluid injector (60, 63) which are fed by fluid feeding means able to feed either just one of the first and second fluid injectors (60, 63) or both injectors simultaneously.

2. The servo valve (1) according to claim 1, in which the first and second fluid injectors (60, 63) are respectively fed by a first and a second fluid supply duct (59, 62) having different fluid bore sections.

3. The servo valve (1) according to claim 1, in which the first and second hydraulic fluid injectors (60, 63) have different fluid bore sections.

4. The servo valve (1) according to claim 1, in which the elastically deformable element (53, 56) is a torsion bar.

5. The servo valve (1) according to claim 1, in which the elastically deformable element is a bending tube.

6. The servo valve (1) according to claim 1, in which the elastically deformable element is a torsion tube.

7. The servo valve (1) according to claim 1, in which the elastically deformable element is part of a mobile element (50) that further comprises a feedback rod (70) designed to collaborate with the power distribution member (5) of the power stage (3).

8. The servo valve (1) according to claim 1, in which with the power stage (3) comprising a power distribution member (5) capable of moving in a tubular housing (6), each end (7, 8) of the tubular housing (6) comprises a respective chamber (9, 10) into which a first hydraulic fluid inlet (12, 14) supplying the hydraulic fluid ejected by the first fluid injector (60) and a second hydraulic fluid inlet (11, 13) supplying the hydraulic fluid ejected by the second fluid injector (63) opens.

9. A hydraulic servo valve comprising:
a power stage comprising a power distribution member operable to move between two extreme positions in order to place one or more service portions in communication with a feed port supplying hydraulic fluid and with a return port;
a control stage that controls the position of the power distribution member, the control stage comprising a torque motor operable to actuate a fluid ejection member secured to an elastically deformable element and to cause a control pressure of the power distribution member to vary;
wherein the fluid ejection member comprises a first and a second fluid injector fed by fluid to either just one of the first and second fluid injectors or to both injectors simultaneously.

* * * * *